United States Patent

[11] 3,583,567

| [72] | Inventor | Gino Maestrelli |
| | | 55, Via Bernardino Quaranta, Milan, Italy |
| [21] | Appl. No. | 846,672 |
| [22] | Filed | Aug. 1, 1969 |
| [45] | Patented | June 8, 1971 |
| [32] | Priority | Mar. 5, 1969 |
| [33] | | Italy |
| [31] | | 136,834/69 |

[54] SOLVENT FILTER PARTICULARLY DESIGNED FOR DRYCLEANING PLANTS
8 Claims, 6 Drawing Figs.

[52] U.S. Cl. ............................................ 210/330, 210/332, 210/345
[51] Int. Cl. .................................................. B01d 29/38, B01d 29/02
[50] Field of Search ........................................ 210/330, 332, 345, 408, 409

[56] References Cited
UNITED STATES PATENTS
| 2,822,926 | 2/1958 | Walton et al. ................ | 210/332X |
| 3,491,887 | 1/1970 | Maestrelli.................... | 210/332X |

*Primary Examiner*—Frank A. Spear, Jr.
*Attorney*—Wenderoth, Lind and Ponack

ABSTRACT: A solvent filter particularly designed for drycleaning plants, comprising a filtering assembly consisting of a plurality of elongated filtering elements supported by, radially extending from and evenly spaced about a shaft rotatably supported within a stationary casing coaxial to said assembly and provided with inwardly protruding ridges adapted for promoting a turbulent motion of the liquid in the spaces confined between adjacent filtering elements when said assembly is rotated within said casing, whereby the liquid is caused to lap the surface of said element and sweep the exhausted filtering powder and dirt thereof.

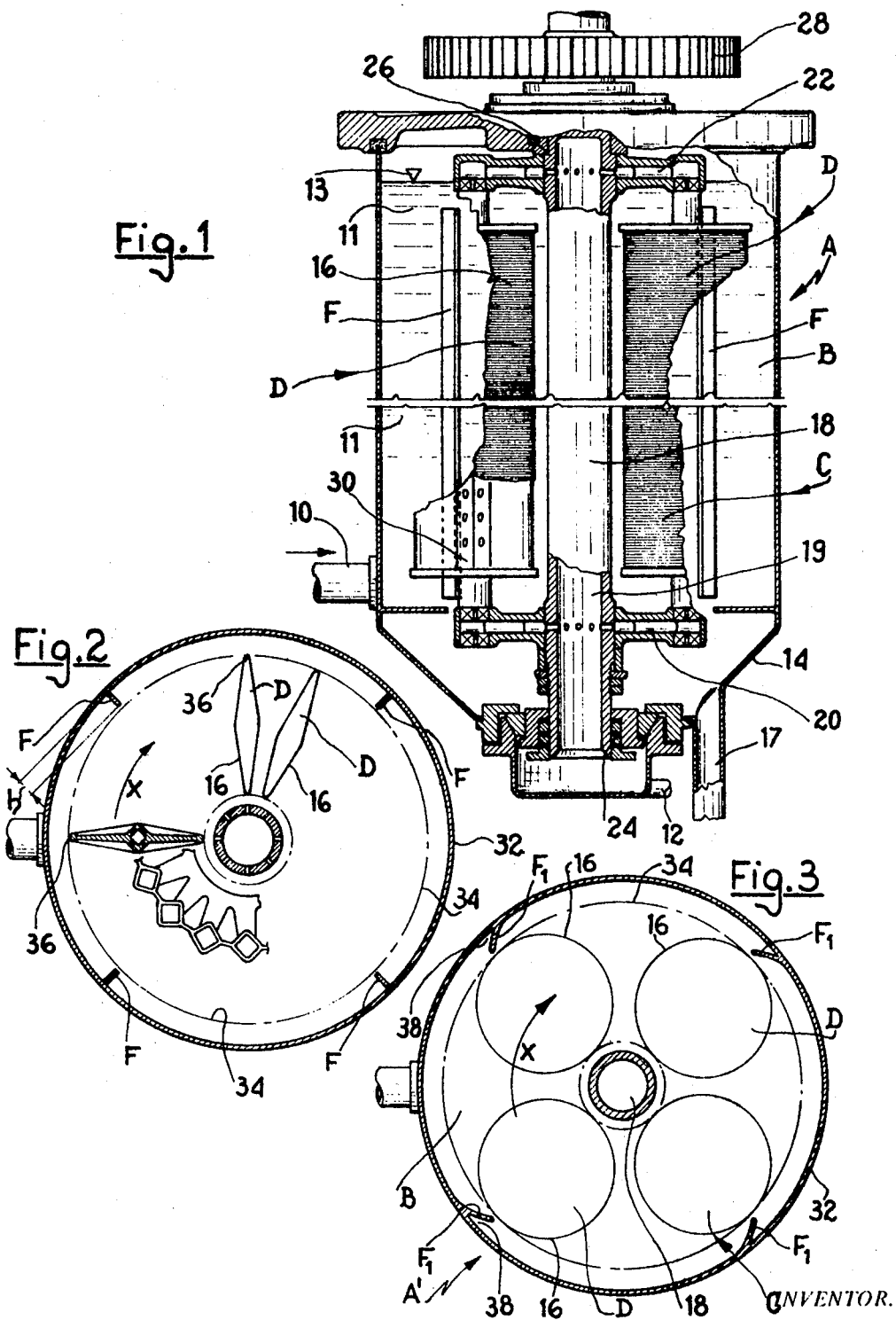

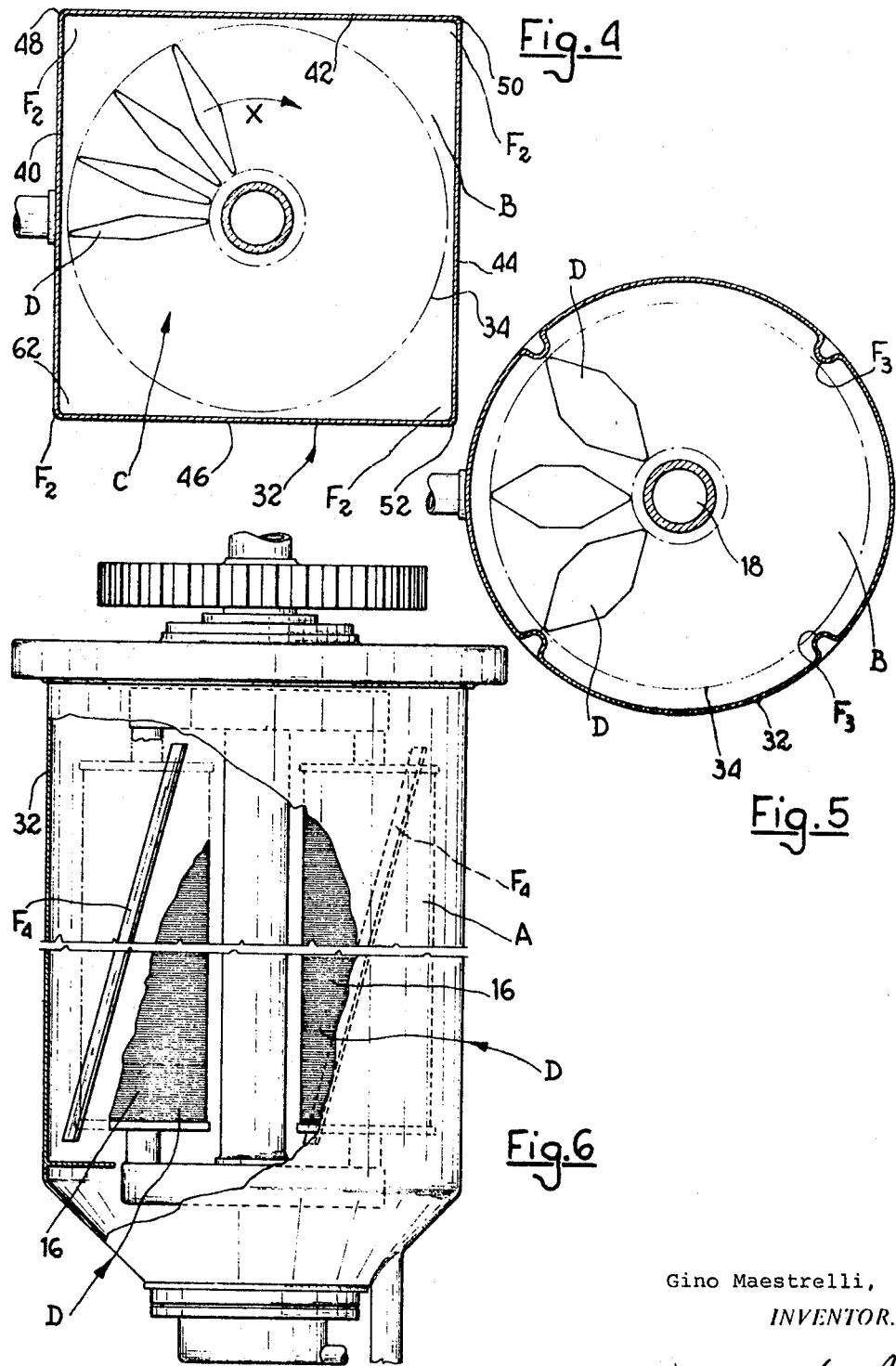

3,583,567

SOLVENT FILTER PARTICULARLY DESIGNED FOR DRYCLEANING PLANTS

CROSS-REFERENCE

Reference should be made to my copending Pat. application Ser. No. 690,626 filed Dec. 14, 1967, now U.S. Pat. No. 3,491,887, issued Jan. 27, 1970.

BACKGROUND OF THE INVENTION

This invention relates to a new and improved filter particularly designed for filtering the solvent liquid in drycleaning plants, and adapted for periodic cleansing of the filtering surfaces thereof of the exhausted filtering powder and the dirt collected on said surfaces.

Said filters are well known in the art. They generally comprise a filtering assembly provided with a plurality of filtering elements and housed within a suitable enclosure. Such filtering elements consist of a hollow frame structure defined by screening surfaces pervious to the liquid solvent and not pervious to suitable powdery filtering substance, such as diatomite, and to the dirt removed from drycleaned goods. The liquid solvent is caused to circulate from outside to inside said filtering elements, on the outer face of which the filtering powder builds up a filtering layer whereon the dirt is progressively collected. For proper operation of the filter, the thus formed dirty layer must be removed and renewed. The removal of said dirty layer is usually termed the cleansing of filter. The most modern drycleaning plants are provided with means for performing said filter cleansing operation without making use of liquid current in counterflow, but instead by promoting an intense motion of liquid in the space confined between the said enclosure and the outer surface of the filtering elements, whereby the liquid exerts an actual sweeping action of said surface and cleanses the exhausted filtering powder and dirt thereof.

In my prior U.S. Pat. No. 3,438,497 I have described and shown a solvent filter comprising at least two rotary filter assemblies each provided with a plurality of essential planar, elongated and vanelike filtering elements, evenly spaced in radial planes about a shaft, the shafts of adjacent assemblies being parallel to each other and so spaced that the elements of said adjacent assembly intermesh gearlike without actual contact. Upon driving such assemblies in phased relationship about the axes of their shafts, the successively intermeshing elements exert a somewhat pumping action on the liquid existing in the spaces defined between adjacent elements and force the liquid outside said spaces. The resulting motion of liquid provides the desired cleansing action.

In my copending Pat. application Ser. No. 690,626 (now U.S. Pat. No. 3,491,887), I have described and shown a highly simplified but very efficient solvent filter which can be advantageously provided with one filter assembly. In such latter construction the said assembly, having a plurality of radially located essentially planar filtering elements arranged about a shaft supported and driven for rotation, is located within a casing having a scroll-like configuration in planes perpendicular to the axis of said shaft. When the assembly is rotated, in the direction in which the radius of the scroll increases, the elements of said assembly act as the impeller vanes of a centrifugal pump and outwardly drive the liquid in the scroll portion, where the liquid rotates until it abuts on the stepped part of said configuration. The liquid is therefore caused to move back towards the shaft axis in suitable spaces provided above and below said elements and the motion is repeated until the rotation of the assembly is discontinued. The thus moved liquid is caused to lap the outer faces of the filtering elements and therefore to exert the desired sweeping action and cleaning of the said outer faces.

SUMMARY OF THE INVENTION

I have now found that such essential sweeping action and cleaning in a solvent filter basically as above, can still be obtained in as efficient a manner in a further simplified construction by arranging and rotating a filtering assembly having radially arranged filtering element, in an enclosure generally coaxial to the axis of said assembly and wherein its inner surface is provided with means arranged and positioned to discontinue the circular rotation of the liquid, promoted by the rotation of the assembly, in its outermost layer adjacent to said inner surface, and which would undisturbedly occur if such inner surface was of uniform cylindrical configuration.

I have found that by discontinuing said rotation, such as by providing inwardly protruding abutments at spaced intervals about said inner surface, an active trailing vortex is promoted at any filtering element of said assembly. The resulting whirling motion of the liquid, adjacent to the outer faces of adjacent elements, provides the desired sweeping and cleansing action on said faces.

According to a preferred embodiment of the invention, the said enclosure consists of a generally cylindrical casing, having a plurality of baffle forming ridges inwardly protruding from and fixedly secured to the inner face of the sidewall of said casing. Such ridges can be parallel to the axis of said casing and of the assembly rotatably supported therewithin, or helically arranged for providing an axial progressing of the turbulence in the liquid. According to a most preferred embodiment, said ridges are arranged to form slanting surfaces in counterflow relatively to the rotational motion of the liquid, for enhancing the amplitude and the intensity of the vortices promoted thereby. According to a modified embodiment, the abutments are provided by constructing the casing of a noncircular cross-sectional configuration in planes perpendicular to the axis of the rotary assembly and comprising sharp dihedral angles causing the impelled liquid to sharply modify its direction of motion and thereby promoting the vortices formation in the interspaces between the filtering elements.

The above and further features of this invention will be best understood from the following description, taken with the accompanying drawings, said description and drawings given only as an example of this invention.

THE DRAWINGS

FIG. 1 is a vertical sectional view of a self-cleaning solvent filter, having one filtering assembly enclosed in the casing, wherein a plurality of baffles is formed, with portions of certain components broken away for clarity.

FIG. 2 is a diagrammatic cross-sectional view of the filter as shown in the FIG. 1.

FIG. 3 is a section similar to that of FIG. 1 comprising a modified construction of the ridges.

FIG. 4 is a section of filter similar to that of FIG. 2 and provided with recesses, by which a turbulent motion is imparted to liquid solvent.

FIG. 5 is a cross-sectional view of filter, wherein the casing has ridges formed by inside directed beads.

FIG. 6 is a vertical sectional view of filter, similar to that of FIG. 1, and wherein the ridges are arranged in an inclined direction along the casing walls.

PREFERRED EMBODIMENT

Referring now to the drawings and firstly to FIGS. 1 and 2 thereof, the self-cleaning filter for the solvent, particularly designed for drycleaning plants of clothes, linen and the like, is indicated generally by the reference letter A. Said filter comprises a tight sealed casing B, which is connected by duct means 10 to the dirty solvent inlet, and by the duct means 12 to the filtered solvent outlet, being thereby the filter connected to and into the solvent circuit of plant. The mud and dirt collected on the casing bottom, after the filter cleaning operations are drained through a duct 17, connected to the bottom 14 of same casing B.

A single filtering assembly C is rotatably supported within the housing B. In other embodiments of the invention, and in particular when filters having higher capacities are required, two or more filtering assemblies may be provided within one casing and such filtering assemblies may be arranged adjacent with one another, thereby contributing to increment the relative motion of liquid and thus increasing the efficiency of cleaning action. In such occurrence, the features of this invention may be combined with those of U.S. Pat. No. 3,438,497.

The assembly C consists of a plurality of radially arranged and suitably spaced filtering elements D, each of which consists of a suitable frame, whereon micrometrically spaced coils of wire 16 are wound, to form filtering surfaces, through which the dirty solvent is passed. Each element D preferably has a lozenge-shaped cross section the plurality of elements D being mounted about a vertical hollow shaft 18, by which same elements D are firmly retained in their mutual positions by means of a bottom plate 20 and of a top plate 22. Both end portions of said hollow shaft extend out of the casing through suitable hydraulic seals, and are rotatably supported by a lower bearing 24 and by an upper bearing 26 respectively. A rotary motion can be imparted to same shaft by a gear 28, keyed thereto, and driven by a suitable transmission and motor means (not shown).

The design of filtering assembly C is such that, owing to passages and ports provided in the rods 30 by which the filter elements D are framed, as well as in the plates 20, 22 and in the shaft 18, the solvent is caused to percolate during the filtering operation, which is performed when the assembly C is stationary, through the filtering surfaces 16, flowing then into the inside of rods 30, wherefrom it flows, through the passages in the plates, into the shaft 18 and to the outlet 12, from which a thoroughly cleaned solvent, wholly free from the dirt collected during the drycleaning operation is recycled.

According to this invention, to achieve the purposes of attaining a thorough cleaning of filter, the wall 32 of casing B is provided with ridges F, which in the embodiment of FIGS. 1 and 2 consist of straight ribs or rods, welded onto the inner side of wall 32, along generatrices of its cylindrical wall surface, such ribs spanning nearly the whole height of said wall.

In the said embodiment, the ribs F are arranged in radial planes at an angle of 90° with each other, and they extend with their protrusion $h$ in a direction radial relative to cylindrical casing B. Said protrusion $h$ must be such that an imaginary cylinder 34, as disposed tangent to outer edges 36 of any elements D, cannot interfere with said ribs. Otherwise stated, the ribs F shall be clear of said imaginary cylinder.

After a given time of operation of filter A, with the filtering assembly C standing still, the filtering surfaces 20 will be clogged by a layer of dirt and exhausted filter powder. Then the gear 28 is driven, e.g. in the direction of arrow X, or in the opposite direction, or also in reciprocating directions, thus imparting a rotary motion to hollow shaft 18, 19; and thus to the assembly C of filtering elements D, and therefore said assembly will rotate, at a given angular speed, within the liquid mass of solvent nearly filling the casing B.

Until the rotary motion of assembly C is continued, the liquid mass of solvent will tend to follow its rotary motion without any displacement thereof relative to filtering element assembly. In other words, the solvent would merely flow along the inner side of wall 32, if such wall would have an uninterrupted cylindrical inner surface.

However, owing to the presence of ribs F, the liquid mass cannot follow the motion of assembly C, because the liquid streamlines are diverted by same ribs that act therefore as baffles, and by which an essential laminar motion of liquid is hindered.

Thus, during the rotation of assembly C together with its filtering elements, the mass 11 of liquid solvent, whose level is indicated at 13 will be discontinued and disturbed by the ridges F, thereby promoting an intense turbulence in the solvent 11, which will forcibly act onto the filtering surfaces 16, cleaning them and removing all dirt, clogged filtering powder, retained greases and the like therefrom, whereafter same surfaces are thoroughly cleaned and ready for the next filtering step, under conditions of high efficiency.

After that a given amount of mud, ensuing from the filtering action and self-cleaning of filter, is collected on the bottom of casing B, the duct 16 is opened to exhaust the muddy liquid.

It has been ascertained that the best results of filter cleaning operation, performed by the rotation of filtering assembly C combined with the action of ridges F, are attained by a somewhat lowering of the level 13 of liquid solvent during or prior to the rotation of assembly C, that is, it is advantageous to continue the rotation of assembly C while the solvent is being discharged through the duct 12, since the turbulence of liquid—and thus the inertial force with which the liquid impinges on the filtering surfaces—is thereby increased.

Referring now to Fig. 3, there is shown a filter A', wherein the means by which a motion of liquid solvent 11 relative to filtering surfaces 16 consist, instead of straight rods, as in the embodiment of FIGS. 1 and 2, of bent baffles $F_1$, and namely of four uniformly spaced baffles, located along generatrices of the cylindric wall 32 of the casing B. All baffles $F_1$ are fitted with their concavities in the same direction, i.e. conveniently in a direction opposite to that of rotation X of filtering assembly C, whereby the liquid solvent will impinge within said concavities at a sharp dihedral angle 38, and thus a rotary motion of same liquid is positively prevented, which results in a strong turbulence thereof and therefore in an efficient cleaning of filtering surfaces 16.

The filtering elements D have been shown in FIG. 3 merely by way of an example, with a circular cross section, instead of a lozenge cross section, as in FIGS. 2, 4 and 5. This is because the same filtering elements may have different cross-sectional shape, nearly independently from the design and arrangement of the means by which the turbulence of the solvent, relative to assembly C, is generated for the purposes of cleaning of filter.

A casing B having a quadrilateral cross section is shown in FIG. 4, i.e. the same or corresponding casing is shaped as a regular parallelepipedon; thus, dihedral angles $F_2$ are formed where the sides 40, 42, 44 and 46 of wall 32 joint in the vertical corners 48, 50, 52, 54, and each one of such dihedral angles acts as an abutment recess in respect of the imaginary circumference 34, surrounding the filtering elements D of assembly C.

An action substantially similar to that of rods or ridges F and by the baffles $F_1$, as previously described, is exerted by such recesses, since they cause a change in the direction of flow of the liquid which is being spun by the rotating assembly C, which results in a turbulent whirling of same liquid, and thus in the required motion thereof, relative to filtering elements, for the cleaning of these latter.

FIG. 5 shows a casing B in which suitable ridges $F_3$ are formed along generatrices of the cylindric wall 32.

Such ridges $F_3$ are formed integrally with the wall 32 by suitably beaded or deep-drawn fluted portions of sheet material, instead of by separate parts secured thereto, as described with reference to FIGS. 1 to 3.

Said ridges $F_3$ are shaped as ribs extending into the inside of casing B. In same FIG. 5, a hexagonal cross section is provided for the filtering elements D; however, as previously stated, same elements may have any other suitable sectional configuration.

In FIG. 6 there is shown a filter A wherein the ridges are formed by rods $F_4$, inclined in respect of the generatrices of cylindrical walls 32 and secured thereto in a manner similar to that of rods F of FIG. 2, such as by welding or the like, the purpose of rods $F_4$ being that of causing the required motions of liquid, relative to filtering elements D, combined with an axial progression of the vortices.

While the invention has been described in detail with respect to certain now preferred examples and embodiments thereof, it will be understood that various changes and modifications may be made, without departing from the spirit and scope of the invention, as defined in the appended claims.

I claim:

1. A solvent filter comprising a casing having lateral wall means and a vertical axis enclosing an elongated cylindrical space, a filter assembly supported for rotation about said axis comprising a shaft at said axis, drive means outside said casing to be rotated for filter cleansing, a plurality of elongated filtering elements having filtering surfaces and mounted about said shaft for rotation therewith and arranged in evenly spaced planes radial to said shaft, inlet duct means connected to said casing and outlet duct means for circulating the solvent through said filtering surfaces for solvent filtering, and drain duct means at the bottom of said casing for exhausting the muddy liquid resulting from filter cleansing, wherein the improvement comprises liquid rotation discontinuing abutting means inwardly protruding from the inner face of the lateral wall means in a space outside said cylindrical space and positioned to promote liquid vortices in said space and between said filtering elements as said assembly is rotated for filter cleansing.

2. A filter as set forth in claim 1, wherein said casing has cylindrical lateral wall means and said abutting means consist of a plurality of baffles forming ridges evenly spaced about and inwardly protruding from the cylindrical inner face of said wall means.

3. A filter as set forth in claim 2, wherein said ridges are arranged parallel to the axis of said casing.

4. A filter as set forth in claim 2, wherein the said ridges are helically arranged respectively to the axis of said casing.

5. A filter as set forth in claim 2, wherein the said ridges consist of inwardly bent portions of the said lateral wall means.

6. A filter as set forth in claim 2, wherein the said ridges are positioned to form a slant directed in counterflow relatively to the direction of the rotational motion of the liquid in said casing, as promoted by the rotation of said assembly within said casing.

7. A filter as set forth in claim 1, wherein said casing has a noncircular configuration in planes perpendicular to its axis and said noncircular configuration includes sharp dihedral angles facing towards said elongated cylindrical space.

8. A filter as set forth in claim 7, wherein said casing is of square cross-sectional configuration in planes perpendicular to said axis and dimensioned to confine at little clearance said elongated cylindrical space between its planar opposite lateral wall portions.